N. R. M. WEIBULL.
STOP OR SET SCREW.
APPLICATION FILED OCT. 16, 1919.
1,346,867.
Patented July 20, 1920.
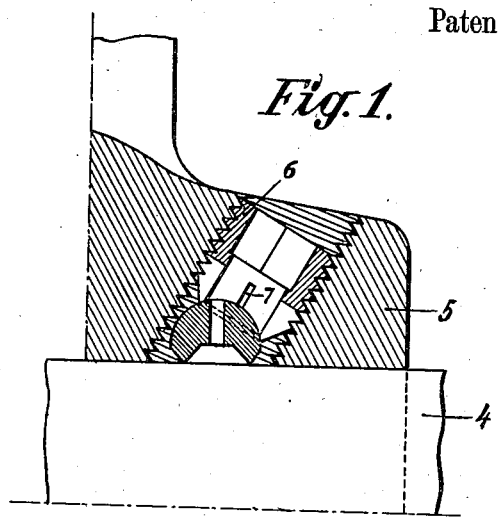
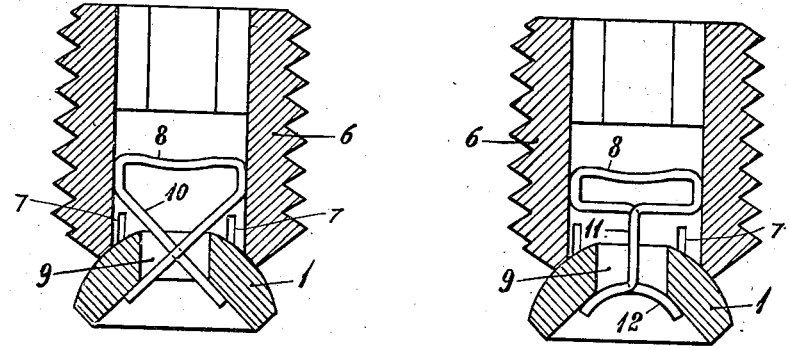
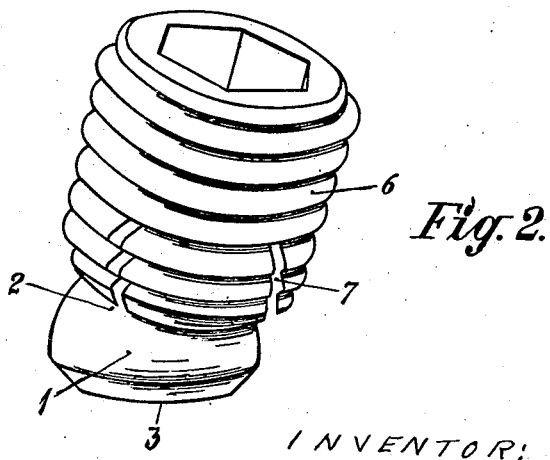
INVENTOR:
Nils Rudolf Martin Weibull
BY Wm Wallace White
ATTY.

UNITED STATES PATENT OFFICE.

NILS RUDOLF MARTIN WEIBULL, OF BOFORS, SWEDEN.

STOP OR SET SCREW.

1,346,867.

Specification of Letters Patent.   Patented July 20, 1920.

Application filed October 16, 1919. Serial No. 331,252.

*To all whom it may concern:*

Be it known that I, NILS RUDOLF MARTIN WEIBULL, a subject of the King of Sweden, residing at Bofors, Sweden, have invented new and useful Improvements in Stop or Set Screws, of which the following is a specification.

This invention has for its object a stop- or set-screw having an advantageous pressing action and especially adapted for use in cases where the screw is situated at an oblique angle to the part against which it is to be pressed. This stop- or set-screw consists of a screw combined with a coöperating loose point, the upper surface of which is spherical and corresponding to the lower end of the screw, while its lower end is provided with one or more edges, which may have for instance an annular form.

By this combination the point under all conditions will be maintained in intimate contact with the member, with which it is intended to coöperate, and, as heretobefore stated, especially when the screw for any reason must be placed in a more or less oblique direction to the surface of the said member.

For maintaining the combined screw in its tightened position according to one form of the invention the screw portion may, at least at its lower end, be provided with a bore, in the wall of which one or more longitudinal slits are arranged, which on the tightening of the screw permit the expansion thereof in radial direction under the action of the reacting pressure from the loose point, so that the screw becomes firmly jammed to the member in which it is inserted.

If the point is quite loose in relation to the screw it will be difficult to introduce the point in the threaded bore, into which the screw is to be inserted. According to another feature of the invention this introduction, however, may be greatly facilitated by connecting the point movably to the screw for instance by means of a holder of wire, plate or the like.

In the accompanying drawing some forms of the invention are illustrated. Figure 1 is a longitudinal section of such a combined screw, inserted in the hub of a wheel, placed on a shaft. Fig. 2 is a perspective view of the same screw alone. Figs. 3 and 4 are longitudinal sections of a screw constructed according to this invention, with the screw movably connected to the point by means of a holder of metal- or steel-wire.

In Figs. 1 and 2 1 is the loose point, consisting of a metal piece with the upper surface 2 of a spherical shape, while the lower part ends in an edge 3 which may be of beveled or similar form and which is intended to be pressed against the shaft 4 by means of the screw 6, obliquely introduced in the hub 5 and provided with a longitudinal bore. Although the screw has a very unsuitable position, the hub 5 by means of the loose point becomes very firmly fixed to the shaft 4, because the position of the edge 3 of the point in relation to the shaft always becomes the same, independently of the inclination of the screw. The lower end of the screw 6 moreover is provided with one or more slits 7 which on the tightening of the screw, on account of the reacting pressure from the loose point, permit the expansion of the screw in radial direction, whereby it becomes firmly jammed to the member in which it is inserted.

In Figs. 3 and 4 1 is the loose spherical headed point, which by means of the screw is to be pressed against the member which it is intended to hold. By means of the holder 8 which is placed in the screw 6 and runs through the opening 9 in the point 1, these two parts are connected in such a manner that they maintain their mutual movability, but yet are connected and thus easily can be mounted. The holder illustrated in Fig. 3 differs from that shown in Fig. 4 only in the fact, that its legs cross one another in the opening 9, while the legs 11 in Fig. 4 run parallel through the opening and outside the same have a bent 12 concentric to the spherical surface of the point.

It will thus be seen that I have provided a set-screw having a floating lower end which will readily adapt itself to the position of any member with which it comes in contact, irrespective of the angular relation of the body portion of the screw to such member.

Having now particularly described the nature of my invention and the manner of its operation, what I claim is:

1. Stop- or set-screw consisting of a screw and a loose point coöperating with it, the said point having a spherical upper surface, placed against the lower end of the screw, while the lower part of the point is provided with a beveled edge.

2. Stop- or set-screw consisting of a screw and a loose point coöperating with it, the said point having a spherical upper surface, placed against the lower end of the screw, while the lower part of the point is provided with an edge, the screw having a bore and the surrounding wall of it being slit longitudinally.

3. Stop- or set-screw consisting of a screw and a loose point coöperating with it, the said point having a spherical upper surface, placed against the lower end of the screw, while the lower part of the point is provided with an edge, the said point being connected to the screw by means of a holder.

4. Stop- or set-screw consisting of a screw and a loose point coöperating with it, the said point having a spherical upper surface placed against the lower end of the screw, while the lower part of the point is provided with an edge, the said point being connected to the screw by means of a bent wire.

5. A set-screw, comprising an exteriorly threaded body portion and a floating end portion.

6. A set-screw, comprising an exteriorly threaded body portion and a floating end portion removably carried by said body portion.

7. A set-screw, comprising an exteriorly threaded body portion and a floating end portion, said body portion being provided with radial slits.

In testimony whereof I have signed my name to this specification.

NILS RUDOLF MARTIN WEIBULL.